Oct. 11, 1966

E. L. CLINE 3,277,703

COMBINED CHASSIS DYNAMOMETER AND BRAKE TESTER
AND METHOD OF TESTING BRAKES

Filed July 18, 1963

INVENTOR
Edwin L. Cline

BY
Bacon & Thomas
ATTORNEYS

Oct. 11, 1966

E. L. CLINE 3,277,703

COMBINED CHASSIS DYNAMOMETER AND BRAKE TESTER
AND METHOD OF TESTING BRAKES

Filed July 18, 1963

INVENTOR
Edwin L. Cline

BY Bacon & Thomas

ATTORNEYS

INVENTOR.
Edwin L. Cline
BY Bacon & Thomas
ATTORNEYS

Oct. 11, 1966     E. L. CLINE     3,277,703
COMBINED CHASSIS DYNAMOMETER AND BRAKE TESTER
AND METHOD OF TESTING BRAKES
Filed July 18, 1963     6 Sheets-Sheet 6

INVENTOR
Edwin L. Cline
BY
Bacon & Thomas
ATTORNEYS

United States Patent Office

3,277,703
Patented Oct. 11, 1966

3,277,703
COMBINED CHASSIS DYNAMOMETER AND BRAKE TESTER AND METHOD OF TESTING BRAKES
Edwin L. Cline, Pasadena, Calif., assignor to Clayton Manufacturing Company, El Monte, Calif., a corporation of California
Filed July 18, 1963, Ser. No. 296,002
27 Claims. (Cl. 73—123)

The present invention relates to chassis dynamometers and more particularly to a combined chassis dynamometer and brake tester for use in testing vehicle wheel brakes on live and/or dead axles, and to a method of testing brakes.

The demand for vehicle chassis dynamometer and wheel brake testing equipment is continually increasing in the automotive testing and servicing field. However, due to the cost of this equipment, it has not been economically feasible to purchase a brake testing unit in addition to a dynamometer unit. The floor space required by a separate brake tester is also often a decisive factor against its purchase. The present invention alleviates these problems by incorporating in a chassis dynamometer relatively inexpensive brake testing equipment to adapt it for additional use as a wheel brake tester for both live and dead axle wheels. The combining of a chassis dynamometer and brake tester in the present single unit makes a brake tester available for about 50% of its usual cost, in addition to affording great convenience in conducting both dynamometer and brake tests with a minimum of floor space.

More specifically, the present apparatus preferably comprises an elongated frame having two sets of rolls mounted thereon for cradling a pair of vehicle wheels, although the frame can be omitted with otherwise suitable roll installation. When the rear wheels of the vehicle are cradled between the rolls, the pair of rolls at the side of the frame nearest the front of the vehicle is considered, for the purposes of this invention, as the drive rolls, and the other pair of rolls, the idle rolls.

According to the principles of the present invention, either the idle rolls or the drive rolls can be utilized in testing the effectiveness of the vehicle wheel brakes. In this connection, the idle rolls are preferably driven by a prime mover through a quill shaft. It is also preferred to use two aligned rolls engaged by separate wheels of the vehicle, rather than a single long roll engaged by both wheels of the vehicle. Thus, the idle or the rear rolls can be employed as a power input to the tires for brake testing purposes. The prime mover for driving these rolls may be an electric motor; a reciprocating engine; an air, hydraulic, steam or gas driven turbine, etc.

For brake testing, two prime movers can be used instead of a single device, one for driving each idle roll, arranged so that the torque or power input to the idle roll under each wheel can be independently measured. If the two drive rolls are connected together, as for purposes of dynamometer testing, they can be disengaged by a clutch, whereby the input power or torque to each tested vehicle brake can be ascertained separately to determine whether the brakes are in balance. It is to be understood, of course, that when a prime mover or prime movers is, or are, active in a brake test, that the dynamometer is completely unloaded.

It is common practice, particularly in the motor truck field to equip the wheels on live or driven axles with brakes. This means that the vehicle engine can supply the wheel driving power for brake testing, if desired. Assuming that the wheels on a live axle of a vehicle are cradled in the rolls, with a given engine throttle, say at 45 miles per hour, the dynamometer could be absorbing 100 horsepower. The vehicle brakes can be applied and the dynamometer load released until the dynamometer instruments (not shown) register zero horsepower. With the engine speed remaining substantially constant, this would mean that the vehicle brakes would then be absorbing 100 horsepower.

The next problem would be to determine whether the vehicle brakes are in balance from side to side of the vehicle. This can be ascertained by using either the drive rolls (front) or the idle rolls (rear) by having them interconnected by a torsionally elastic coupling or drive member. If the vehicle brakes are set equal on both sides, no unbalanced torque will be effective upon the rolls. If the brakes are not equal, because of the vehicle differential mechanism, the roll at the sides of the vehicle that has the loose brake will be subjected to torque and will transmit the same through the torsionally elastic coupling to the corresponding roll at the relatively tight side of said vehicle. This torque will thus be transferred from the tight-side roll to its engaging wheel and associated tight brake. Equilibrium will occur and the degree of unbalance of braking effect will be indicated by the angular twist or "wind-up" that occurs in the drive means between the two rolls, and which is permitted by the torsionally elastic coupling.

The torsionally elastic coupling includes a member in the form of a quill shaft connected at each end with a flexible spline type shaft coupling. The quill drive can be used to interconnect the front or drive rolls when the present device is used as a power absorption dynamometer. Hence, when the dynamometer is unloaded, and as the brakes are applied, twist in the quill shaft will reflect any brake unbalance, as described. As a precaution, the quill shaft is protected against being subjected to torque stress exceeding its elastic limit. This is done by attaching a torque tube to the hub at one end of the quill shaft and connecting the tube with the opposite hub so that it is free to rotate through only a limited angle, so that the maximum "wind-up" of the quill shaft is maintained within the range of safe stress limits in either direction of rotation.

Indicating means are provided to measure the wind up in the quill drive and thus show whether the vehicle brakes are unbalanced. Such means includes two discs preferably having openings in their periphery arranged to register, or overlap to varying degrees, depending upon the extent of angular twist of the quill shaft between its two ends. A light beam is associated with the discs at one side thereof and directed so that light therefrom can pass through the openings and energize a photoconductive cell positioned on the opposite side of the discs. The light passing through the aligned openings acts upon the photoconductive cell, causing it to produce a voltage whose output is connected with a voltmeter calibrated so that when the needle of the meter is in a zero position, it will be at the center of the dial markings. The electrical output from the activated cell will increase or decrease in accordance with the increase or decrease in the amount of light reaching the cell. The discs are preset on their mountings so that when the roll, quill shaft and disc assembly are rotating, without any quill shaft wind up, the openings are so positioned that the light reaching the photoconductive cell will cause the cell to produce sufficient voltage to deflect the meter needle to its zero position. As one disc begins to lead the other from the preset relative position, due to quill shaft wind up, the openings will open or close, depending on the direction of the wind up, causing an increase or decrease in the amount of light reaching the photoconductive cell, resulting in a corresponding change in voltage and an increasing deflection in the meter needle. The meter is calibrated so that it will read in terms of torque or force. Movement of the needle to the right indicates a tight right-hand wheel brake; whereas, movement of the needle to the left indicates a tight left-hand wheel brake.

The elastic coupling means between the rolls for the testing of brake balance on live axles can be located between either the front drive rolls or the rear idle rolls. The rear or idle rolls are preferred for use in brake testing for reasons that will be pointed out hereinafter.

When testing a vehicle having a dead axle, that is, an axle that does not receive driving power from the vehicle engine, the power must be put into the rolls to turn the vehicle wheel. This is effected with the present invention by using prime mover means to drive the idle rolls, as indicated hereinabove. A quill shaft is preferably positioned between the prime mover and the rear roll connected therewith. When a single prime mover is used, the rear rolls are interconnected by a second quill shaft, which would have about half the capacity of the quill shaft connected between the first rolls and the prime mover. The wind up in the quill shaft between the prime mover and the first roll would be measured by the photoconductive torque system and shown on a meter in terms of torque or force. The wind up in the quill shaft between the two rolls would be indicated on a second meter, which, if the brakes are in balance, would indicate a needle deflection equal to that of the first meter.

When the two front or drive rolls are utilized with a power absorption unit to function as a drive means for said unit, the means interconnecting said front rolls includes a clutch, which can be released when the rear rolls are used for brake testing. Alternatively, a torsionally elastic connecting shaft may be employed between the two front rolls.

Accordingly, the principal object of the invention is to provide a chassis dynamometer that is designed so that it can also be used for vehicle wheel brake testing purposes, and for testing the brakes at opposite sides of the vehicle to determine whether they are providing equal braking effort.

Another object is to provide vehicle brake testing means including a pair of interconnected rolls, but wherein provision is made for permitting one of the rolls to rotate angularly out of phase with respect to the other roll while both rolls are being rotated at the same speed by the vehicle wheels, so that the relative angular rotation, or out-of-phase relation of the rolls, can be used to actuate torque measuring means for indicating the state of balance of the wheel brakes.

Another object is to provide a chassis dynamometer including means for absorbing the power developed by the engine of a vehicle undergoing test, while at the same time providing means for testing the vehicle brake balance independently of any braking effort that may be produced by the power absorption unit.

Another object is to provide a combined chassis dynamometer and brake testing device wherein separate prime movers are connected with idle rolls that drive the wheels of the vehicle, and wherein the drive rolls normally used in dynamometer testing can be disconnected from each other while the vehicle brakes are being tested.

Another object is to provide brake testing apparatus wherein a drive member for the roll or rolls engaging the vehicle tire is designed so that it will twist between its ends under torque load, and wherein the angular twist of the drive member is utilized to actuate an indicator to show the amount of torque being delivered to the vehicle wheel.

Another object is to provide measuring means for indicating torque being transmitted by a drive member, that is responsive to the angular twist produced in the drive member while transmitting working torque.

Another object is to provide measuring means of the foregoing character that will provide a torque reading regardless of the direction in which the drive member is being rotated.

Other objects and advantages of the invention will be apparent from the following description taken in conjunction with the accompanying drawings, in which.

One of the very important features of the present invention is that the rear or idle rolls, that is, the rolls that are farthest from the front of the vehicle during a dynamometer test, are employed for testing the vehicle brakes. It has been found that there are definite advantages to using the idle rolls as the brake testing rolls, instead of using the dynamometer drive rolls as the brake testing rolls, as will be explained more fully hereinafter.

Figures 1, 2:
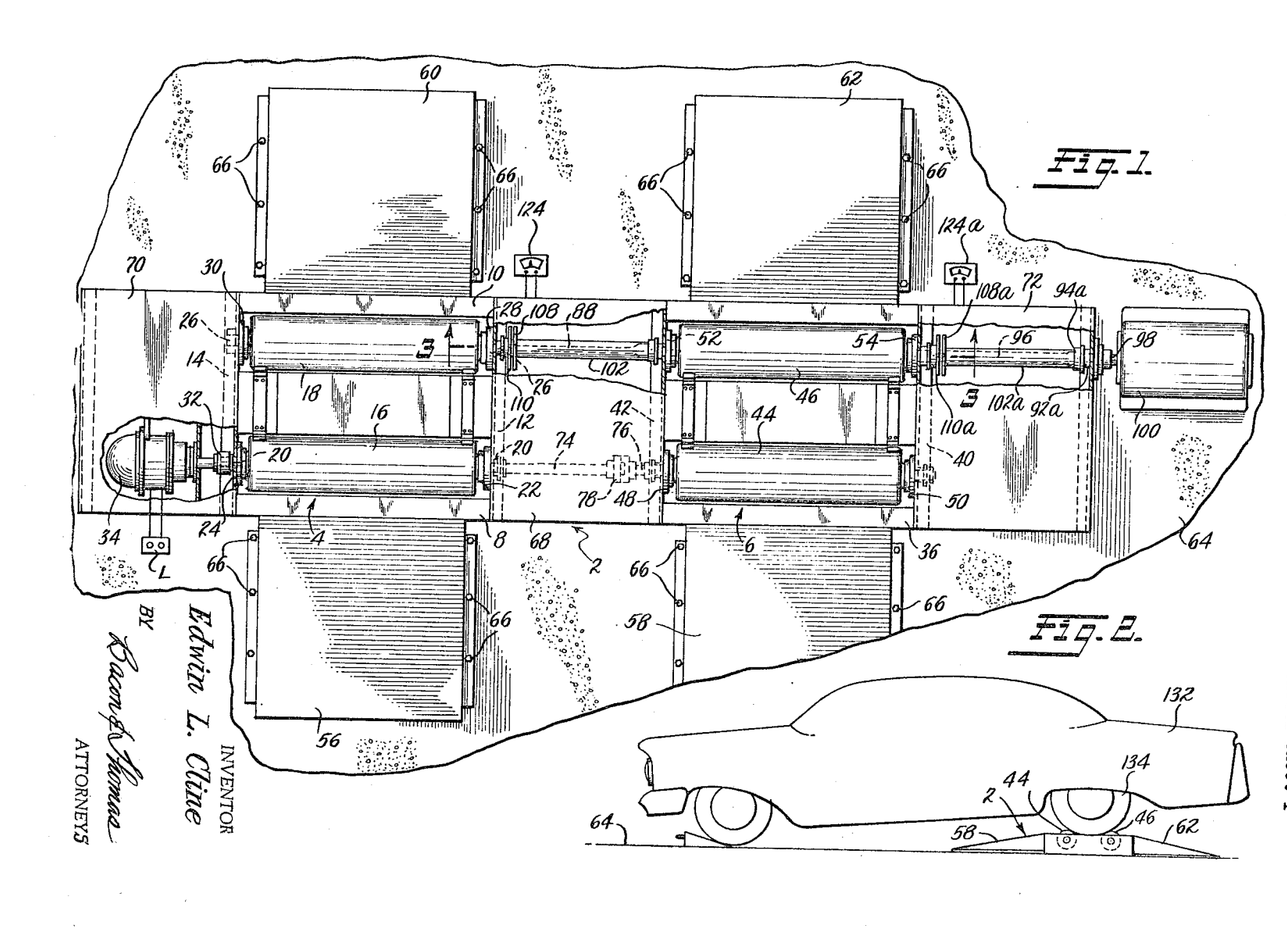
FIG. 1 is a plan view of a combined chassis dynamometer and brake tester embodying the principles of the present invention.
FIG. 2 is a diagrammatic view illustrating the manner in which the rear wheels of a vehicle are cradled in the rolls of the apparatus shown in FIG. 1.

Referring to FIG. 1 of the drawings, a dynamometer frame is generally indicated by the numeral 2 and may comprise two roll units 4 and 6. The unit 4 comprises side channels 8 and 10 interconnected by transverse channel members 12 and 14. The unit 4 also includes a pair of rolls consisting of a drive roll 16 and an idle roll 18. The drive roll 16 has stub shafts 20 projecting from the opposite ends thereof that are rotatably mounted in bearings 22 and 24, respectively, secured by the transverse channel members 13 and 14. The idle roll 18 has similar stub shafts 26 mounted in bearings 28 and 30 fixed to the transverse channel members 12 and 14, respectively. The left stub shaft 20 of the drive roll 16 is connected by a coupling 32 with a power absorption unit 34. The power absorption unit 34 and the means L for controlling the load which it can impose on the drive roll 16 form no part of the present invention and may be constructed as disclosed, for example, in Patent Number 2,768,711.

The roll unit 6 is constructed in a manner similar to the roll unit 4 and includes side channel members 36 and 38 interconnected by transverse channel members 40 and 42, with a drive roll 44 and an idle roll 46, respectively, mounted in bearings 48–50 and 52–54 carried by the transverse members 40 and 42, as shown.

Ramps 56 and 58 are positioned at the side of the units 4 and 6, respectively, adjacent the drive rolls 16 and 44, respectively. Similar ramps 60 and 62 are positioned at the opposite sides of the units 4 and 6, adjacent the idle rolls 18 and 46, respectively. The ramps 56, 58, 60 and 62 are secured to the floor 64 by bolts 66.

The units 4 and 6 are arranged with their rolls in parallel longitudinal alignment and are interconnected by a plate 68 secured to the transverse frame members 12 and 42. A frame structure 70 encloses the power absorption unit 34 and is connected with the transverse member 14 at the left end of the unit 4. A similar frame structure 72 is located at the right end of roll unit 6 and is connected to the transverse member 40. The roll units 4 and 6 can be secured to the floor 64 by any suitable means, for example, by bolts 73, as shown in FIG. 3.

The adjacent ends of the drive rolls 16 and 44 are connected to shaft sections 74 and 76, respectively, interconnected by a clutch 78 operable to disconnect the drive rolls 16 and 44, when desired. The clutch 78 may be of any conventional construction.

Figure 3:
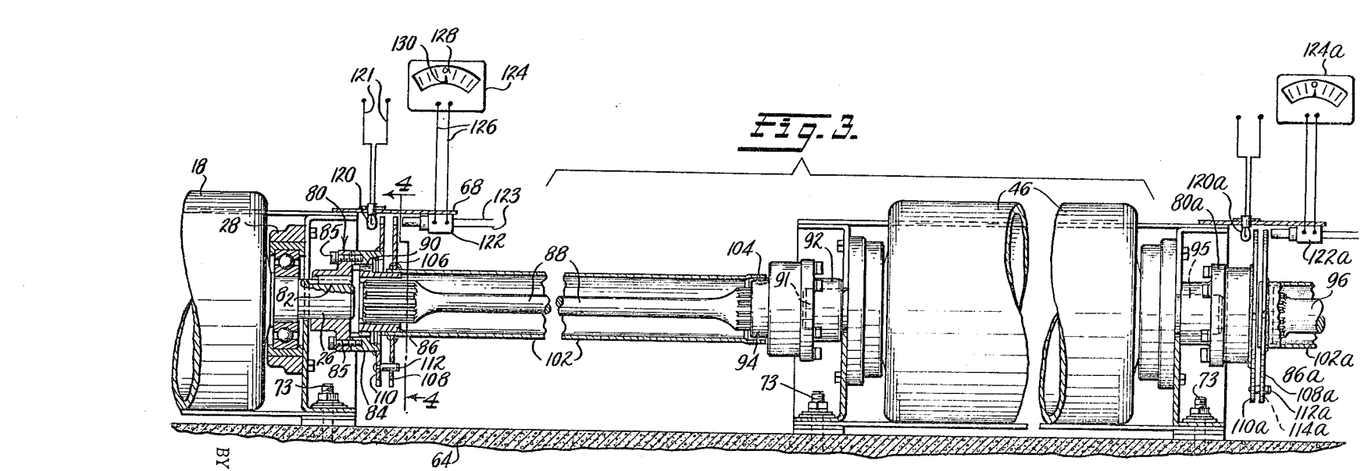
FIG. 3 is an enlarged vertical sectional view through the idle rolls, the quill shaft and the torque tube interconnecting the rolls, taken on the line 3—3 of FIG. 1.

Referring to FIG. 3, the stub shaft 26 at the right end of idle roll 18 has a hub assembly 80 secured thereto by a key 82. A splined ring 84 is secured to the hub structure 80 by bolts 85. A coupling element 86 is secured to one end of a quill shaft 88 and has external splines 90 that slidably engage with splines in the ring 84 to drivingly interconnect the quill shaft 88 with the idle roll 18. A stub shaft 91 at the left end of idle roll 46 has a hub structure 92, similar to the hub structure 80 keyed thereto. A splined coupling 94, similar to the coupling 86, is mounted upon the right end of the quill shaft 88 to provide a driving connection between the idle roll 46 and the quill shaft 88. The stub shaft 95 at the right end of roll 46 has a hub structure 80a keyed thereto and associated with a splined coupling 86a identical to the coupling element 86. A second quill shaft 96 has a splined end nonrotatably secured to the coupling element 86a.

Referring now to FIG. 1, the right end of the quill shaft 96 is connected with a shaft 98 of a prime mover 100, by a hub structure 92a identical to the hub structure 92 and a splined coupling element 94a identical to the coupling element 94. It will be noted that the quill shaft 96 is made substantially larger in diameter than the quill shaft 88, for a purpose that will be explained later.

It will be apparent from FIG. 1 that, upon operation of the prime mover 100, torque will be transmitted through quill shaft 96 to idle roll 46 and from roll 46 through quill shaft 88 to idle roll 18. The quill shafts 88 and 96 are designed so that the normal working torque which they are required to transmit during brake testing operations can cause twisting of the quill shafts, or "wind-up," between the ends of the shafts. In other words, the working torque load will cause one end of the quill shafts to rotate through a small angle relative to the opposite end of said quill shafts. Since the quill shaft 96 is required to transmit a greater working torque than the quill shaft 88, it is made of larger diameter. At the same time, undue wind-up of the torque shafts 88 and 96 to an extent that would cause the stress therein to exceed the elastic limit of the shaft material, is undesirable. Accordingly, to avoid excessive stress in the quill shafts 88 and 96, torque tubes and other means are associated therewith in the following manner:

Referring to FIG. 3, a torque tube 102 has one end 104 thereof secured by welding or otherwise to the hub coupling element 94. The other end 106 of the torque tube 102 telescopes with, and is rotatably mounted relative to the splined hub coupling element 86 at the left end of the quill shaft 88. A disc 108 is welded to the end 106 of the torque tube 102 to secure said disc to said tube. A similar disc 110 is welded on the adjacent end of the splined ring 84. A pin 112 is fixed to the disc 110 and projects through a slot 114 of predetermined length in the disc 108. The length of the slot 114 is such that it will permit angular movement of the discs 108 and 110 through a total angle of about 15° to 20°. The aforementioned angular movement results from the twist, or wind-up, provided for in quill shaft 88 under working torque load, since the disc 110, in effect, is fixedly connected with one end of the roll 18 and the quill shaft 88 through the hub structure 80 and coupling 86; and the disc 108 is fixedly connected with the opposite end of said quill shaft through the splined coupling 94 and the torque tube 102.

It will be understood that an increase in wind-up of the quill shaft is prevented when the pin 112 engages either end of the slot 114. This is self-evident from the fact that the pin 112 will then provide a positive drive between the two hub structures 80 and 92 through the discs 108 and 110. Advantage is taken of the aforementioned wind-up of the quill shaft 88 to actuate means for indicating the effectiveness of the brake on a vehicle wheel, as will be explained more fully hereinafter.

Referring to FIGS. 1 and 3, the quill shaft 96 has a torque tube 102a connected with a splined coupling 94a and with a disc 108a, identical to the torque tube 102, coupling 94 and disc 108. The hub structure 80a has a disc 110a welded thereto, in the same manner as the disc 110 is secured to the hub structure 80. A pin arrangement identical to that provided by the pin 112 and slot 114 is provided by a pin 112a on disc 110a and a slot 114a in disc 108a. Thus, excessive wind-up of the quill shaft 96 is prevented by the torque tube 102a and the discs 108a and 110a and their interconnecting pin 112a. The wind-up of the quill shaft 96 is utilized to measure the effectiveness of the brake on a vehicle wheel engaged with the roll 46 in the same manner intimated with respect to quill shaft 88 and its associated roll 18.

Figure 4:
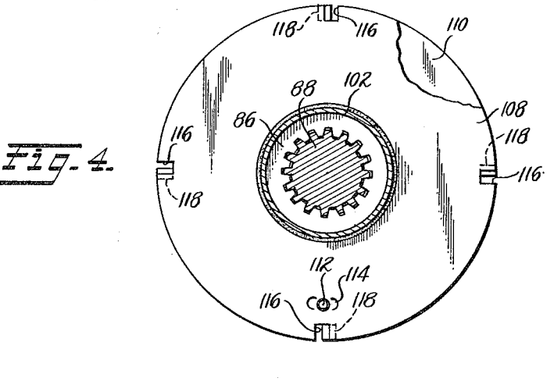
FIG. 4 is a vertical sectional view, taken on the line 4—4 of FIG. 3, illustrating the preset, or initial non-torque, position of the angularly rotatable discs carried by the quill shaft and torque tube.
Figure 5:
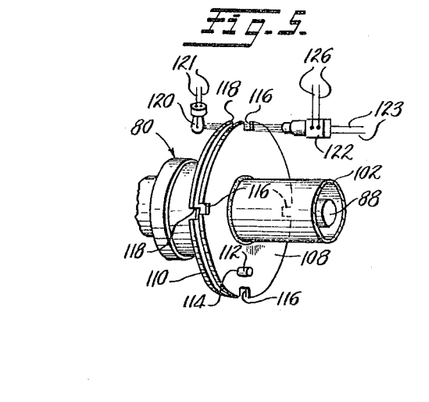
FIGURE 5 is a diagrammatic perspective view illustrating in which the light source and photosensitive cell are associated with the discs.

Referring to FIGS. 4 and 5, it will be noted that the disc 108 is provided with four openings or notches 116 at its outer periphery, spaced 90° apart. The disc 110 has four similar openings or notches 118. The discs 108 and 110 are initially assembled relative to their supporting members so that when there is no torque load on the quill shaft 88, the openings 116 and 118 will be overlapped for approximately one-half of their circumferential length, as illustrated in FIG. 4. It will be understood that upon relative angular movement of discs 108 and 110, the overlapping relationship of the openings 116 and 118 will change in a manner to increase or decrease the extent of overlap, depending upon the direction of relative rotation of discs 108 and 110, and the amount of torque being transmitted. This results in varying the circumferential width of the gap across the discs 108 and 110. The change in width of the gap is utilized to control means that will indicate, or measure, the torque being transmitted. Thus, a conventional light source 120 is mounted on the plate 68 adjacent the left side of the disc 110. Electrical current is supplied to the light source 120 through conductors 121. A conventional photoconductive cell 122 is mounted on the plate 68 adjacent the right side of the disc 108 and has current conducted thereto through leads 123. The light source 120 and photoconductive cell 122 are in longitudinal alignment, so that a beam from the light source 120 can pass to the photoconductive cell 122 to actuate the same through the gap across the discs 108 and 110 produced by the openings 116 and 118, as the discs rotate. The electrical source for the photoconductive cell 122 is at constant voltage and its output is conducted to a volt meter 124 through conductors 126. The volt meter 124 has a dial 128 with a zero calibration at the mid-point thereto, and a needle 130 that can sweep across the dial 128 in either direction from the zero point. The electrical output from the photoconductive cell 122 increases or decreases in accordance with the increase or decrease in the light reaching the cell from the light source 120. The initial positioning of the discs 108 and 110 with the openings 116 and 118 overlapping about 50%, is such that the light beam positions the needle 130 at the zero point when no torque is being transmitted by the quill shaft 88.

It will be understood that as one disc begins to lead the other from the pre-set initial position, due to quill shaft wind-up resulting from angular phase change of one idle roll relative to the other, the effective gap will open or close, depending upon the direction of wind-up, causing an increase or decrease in the amount of light reaching the photoconductive cell 122, and a corresponding change in voltage or deflection of the needle of the meter 124. The dial 128 is calibrated so that the meter reads in terms of torque or force. A movement of the needle 130 to the right indicates a tight right-hand wheel brake and a movement to the left indicates a tight left-hand wheel brake.

The discs 108a and 110a, associated with the idle roll 46, also have a light source 120a, a photoconductive cell 122a, and a meter 124a, similar to the light source 120, photoconductive cell 122 and meter 124, operatively associated therewith. The discs 108a and 110a function in the same manner as the discs 108 and 110 to indicate the torque effective upon the brake of the wheel engaged with roll 46.

In using the apparatus shown in FIG. 1, a vehicle 132 is positioned thereon with its rear wheels 134 cradled between the sets or pairs of rolls 16–18 and 44–46, and with the drive rolls 16 and 44 nearest to the front end of the vehicle. If a test of the engine is to be made, the dynamometer unit 34 is operated in a manner well understood in the art.

The power of the engine at any given throttle opening can be measured or determined by the power absorption unit 34 working as a dynamometer. If the brakes on the vehicle wheels 134 are to be tested, the aforesaid measured power from the engine can be absorbed by the brakes. The power absorption unit 34 would be disengaged or deactivated to substantially zero absorption through controls (not shown) common in dynamometer art. Thus, the brakes on vehicle wheels 134 would be absorbing substantially all of the previously determined engine power. In order to determine if there is unequal brake adjustment, the clutch 78 would be disengaged. Should each of the vehicle rear wheel brakes absorb equal power, no wind-up would result in the quill shaft 88, and the meter 124 would read zero. If, on the other hand, the left brake is tighter than the right, rolls 16 and 18 will tend to lead the rotation of rolls 44 and 46 due to the wind-up in the quill shaft 88 caused by torque unbalance. The reading on meter 124 will indicate the amount of unbalance in torque or force by the degree of movement of the needle 130 to the left. Should the right brake be tighter than the left, rolls 44 and 46 will tend to lead the rotation of rolls 16 and 18 and the needle 130 will swing to the right, indicating a tight right-hand brake.

Figure 10:
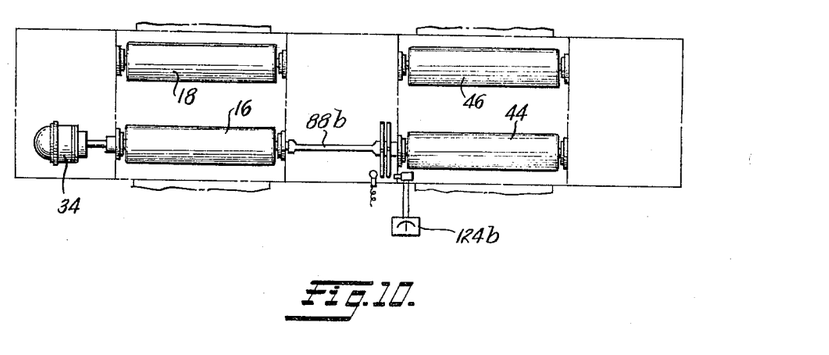
FIG. 10 is a similar view of a combined chassis dynamometer and brake tester, wherein the idle rolls are interconnected by a quill shaft and one of said rolls is connected with a power absorption unit.

Obviously, the quill shaft 88 can be located between either the idle rolls 18 and 46, as shown in FIG. 1, or between the drive rolls 16 and 44, as shown in FIG. 10, and there is no need for the prime mover 100 when using the vehicle engine for testing the brakes located on the vehicle driving axle.

When brakes located in vehicle wheels not receiving power from the vehicle engine are to be tested for effectiveness and equality of adjustment, the prime mover 100 is started to effect a drive of the roll 46 through the quill shaft 96, and from the idle roll 46 through the quill shaft 88 to the idle roll 18. The clutch 78, FIG. 1, between the drive rolls 16 and 44, is disconnected so that the latter rolls can rotate independently of each other.

As the idle rolls 18 and 46 are rotated by the prime mover 100, they will act on the tires engaged therewith and tend to rotate the wheels 134. The resistance to rotation of the right rear wheel will cause a wind-up of the quill shaft 96 and produce a corresponding reading on the meter 124a. Similarly, the resistance to rotation of the left wheel will cause a wind-up of the quill shaft 88, which will be indicated on the meter 124. The reading of meters 124 and 124a will give an indication of the torque being absorbed by the brakes and will also give an indication of whether one brake is tighter than the other, or that the brakes are equally adjusted, depending upon the different or identical readings of these meters.

Figure 6:
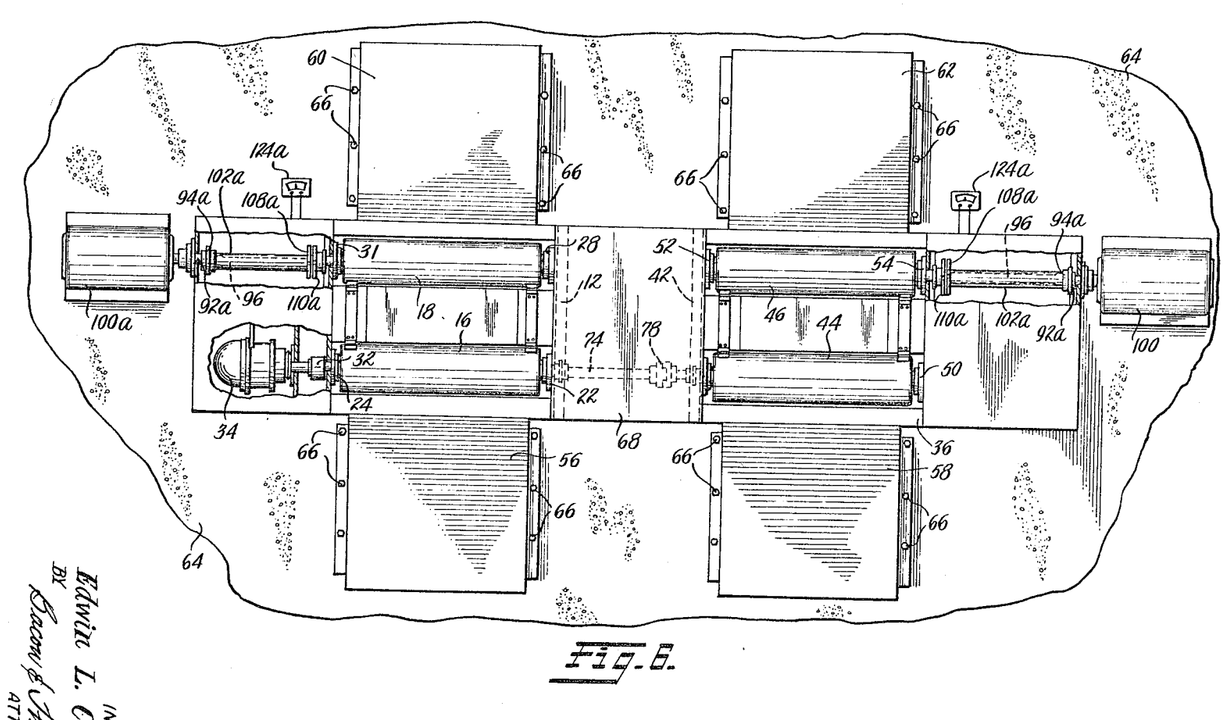
FIG. 6 is a diagrammatic view of a modified form of a combined dynamometer and brake testing device wherein a separate prime mover is connected with each idle roll.

FIG. 6 illustrates another embodiment of a combined chassin dynamometer and brake tester wherein parts corresponding to those already described have been identified by the same numerals. The principal difference between the devices shown in FIGS. 1 and 6 is that FIG. 6 shows the idle roll 18 driven by a separate prime mover 100a, instead of being driven by the quill shaft 88, as shown in FIG. 1. The prime mover 100a drives the roll 18 through a quill shaft 96, etc., identical to the parts employed to drive the roll 46, wherefore, such parts including the relatively rotatable discs 108a and 110a have been identified by the same numerals.

The operation of the brake testing apparatus shown in FIG. 6 is identical to that of the apparatus shown in FIG. 1, except that rotation of the idle rolls 18 and 46 to drive the vehicle wheels when engaged therewith is effected independently through the separate prime movers 100 and 100a.

It will be understood that any conventional or suitable roll brake (not shown) may be associated with the rolls 16, 18, 44 and 46 to hold the same stationary to facilitate removal of a vehicle from said rolls.

As has been stated hereinbefore, there are certain operational advantages in using the rear or idle rolls 18 and 46 as driving rolls for the vehicle wheels whose brakes are to be tested. These will now be considered.

Referring to FIG. 2, it will be understood that if force is applied through the drive rolls 16 and 44 to rotate the wheels 134, the vehicle 132 will tend to be pushed backwards as the vehicle brakes are applied and the axle weight will shift from the drive rolls 16 and 44 to the idle rolls 18 and 46. Slippage would occur between the drive rolls 16 and 44 and the wheel tires before a significant amount of braking force could be applied to the vehicle brake.

Figure 7:
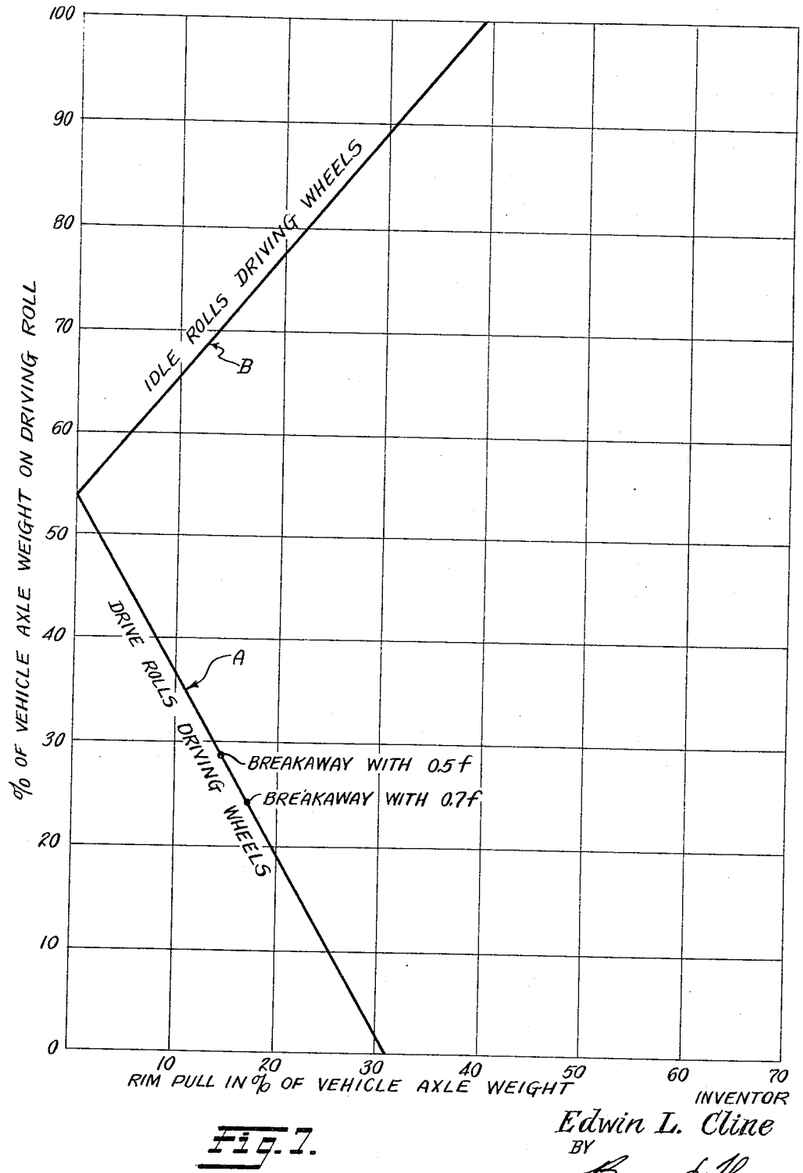
FIG. 7 is a graph which illustrates the advantages of using the idle rolls, rather than the drive rolls of a dynamometer for vehicle brake testing purposes.

When at rest, that is, without any rim pull, there will be about 54% of the axle weight resting upon the rolls, as indicated by the graph shown in FIG. 7, wherein the percentage of vehicle axle weight on the driving rolls is plotted against the rim pull in percentage of the vehicle axle weight. When the drive rolls 16 and 44 are being driven by a source of power and the vehicle tires are resisting rotation, zero axle load would exist on said drive rolls when the rim pull equals about 31% of the axle weight. However, this point can never be reached.

On a paved road, the coefficient of friction of the tires against the road surface averages between 0.6f and 0.8f before breakaway. On dynamometer rolls, the coefficient of friction is between 0.5f and 0.7f. Assuming a 0.5 breakaway, complete slipping between the tires and rolls, will occur at a rim pull equal to about 14.5% of the axle weight, as indicated on curve A. Using a coefficient of friction of 0.7, the breakaway will occur at a rim pull equal to about 17% of the axle weight.

The limitations of this arrangement become apparent when the vehicle forces indicated above are compared to the designed ability of the vehicle brakes. They are capable of sliding the tires on the road with the vehicle fully loaded. In other words, capable of causing the vehicle to skid when fully loaded. Using an average tire-to-road coefficient of friction of 0.7, it can be seen that to completely test brakes, a rim pull equal to about 70% of the axle weight is required. At best, using 0.7 coefficient of friction between the tire and roll, the curve A illustrated indicates that the breakaway point will afford no better than about 17%, or less than about ¼ the pull required for full brake examination.

On the other hand, if power is put into the shaft of the idle rolls 18 and 46 and the rotation of the tire is resisted, the vehicle will tend to move backward with axle loads on the idle rolls 18 and 46 increasing from 54% to 100% when all weight is off the drive rolls 16 and 44. Curve B, FIG. 7, shows the increased axle weight on the idle rolls 18 and 46 as the rim pull is increased.

When 100% of the axle weight is on the idle rolls 18 and 46, the only difference between rim pull on the rolls and on a road would be the difference in the coefficient of friction. As stated above, an average value before breakaway on the road would be 70% of the axle weight. If a coefficient of friction of 0.7 was realized on the idle rolls 18 and 46, breakaway would also occur at 70% of the axle weight. With a coefficient of friction of 0.5, breakaway would occur with a rim pull of 50% of the axle load, but the prime mover 100 would be capable of applying force to the tires at least equal to 71½% of those experienced on the road, instead of 20.7% with the front roll driving at a coeffiicent of friction of 0.5.

When 100% of the vehicle axle load is on the idle rolls 18 and 46, the vehicle would be pushed off the rolls backwards. Therefore, a restraining member (not shown) is required to obtain these high values. Such restraining member may take the form of a chain attached loosely between the dynamometer and the rear of the vehicle. As the vehicle tended to move backwards, the chain would become taut and restrain it.

As is shown by Curve B, 100% of the axle load is reached at a rim pull of 39.5% of actual weight, assuming a coefficient of friction of 0.7. This is the point where pullout will occur with the vehicle not restrained. This is 2.32 times the force possible when the drive rolls 16 and 44 are driven in testing the vehicle brakes. Thus, it is clear that more effective brake testing can be achieved by driving the idle rolls 18 and 46 than would be possible by driving the drive rolls 16 and 44 to effect rotation of the vehicle wheels 134 during a vehicle wheel brake test.

Figure 8:
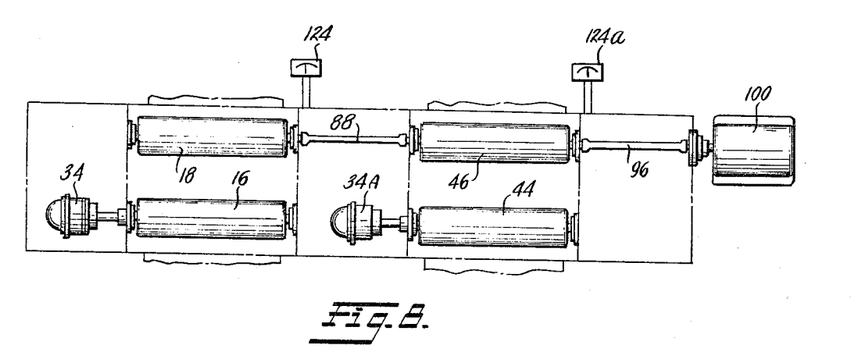
FIG. 8 is a diagrammatic plan view of a combined chassis dynamometer and brake tester, wherein a prime mover is connected through a quill shaft with the idle rolls, and wherein each of the drive rolls is connected with a separate power absorption unit.

FIG. 8 diagrammatically illustrates a further embodiment of the invention, which like the embodiment shown in FIG. 1 can be used to test the brakes on a dead axle, that is, on an axle not driven by the vehicle engine, as well as on a live axle. The combined dynamometer and brake tester shown in FIG. 8 is identical to that shown in FIG. 1, except that the shaft sections 74 and 76 and the coupling 78 have been omitted and a power absorption unit 34A is connected with the drive roll 44. In the interest of brevity, the corresponding parts have been identified by like numbers and a description thereof will not be repeated. In this arrangement, vehicle wheel power can be absorbed by the power absorption units 34 and 34A in the conventional manner, and the vehicle engine can be used to supply power to the wheel brakes, thereby indicating their effectiveness. Such testing can be made with the power absorption units unloaded, or effecting substantially zero power absorption. If the wheel brakes are not equally adjusted, the quill shaft 88 will wind up and the force measuring meter 124 will indicate the degree of force unbalance or inequality of adjustment of the brakes on the two vehicle wheels engaged with the rolls 16–18, and 44–46.

In order to test the vehicle brakes where there is no vehicle power available to drive the wheels, such as the wheels on a dead axle, or the front wheels of a normal vehicle, the prime mover 100 is used to rotate the rear rolls 18 and 46 to obtain maximum tractive effort on the wheels. The relative wind-up of the shaft 96 between the prime mover 100 and the first roll 46 will be shown on the meter 124a and will indicate the total power being delivered to the wheels and also indicate the total brake effectiveness. Wind-up of the shaft 88 between the rear rolls 18 and 46 will be indicated by the meter 124. The relative values, as indicated on meters 124 and 124a, will indicate the inequality in the brake adjustment.

Figure 9:
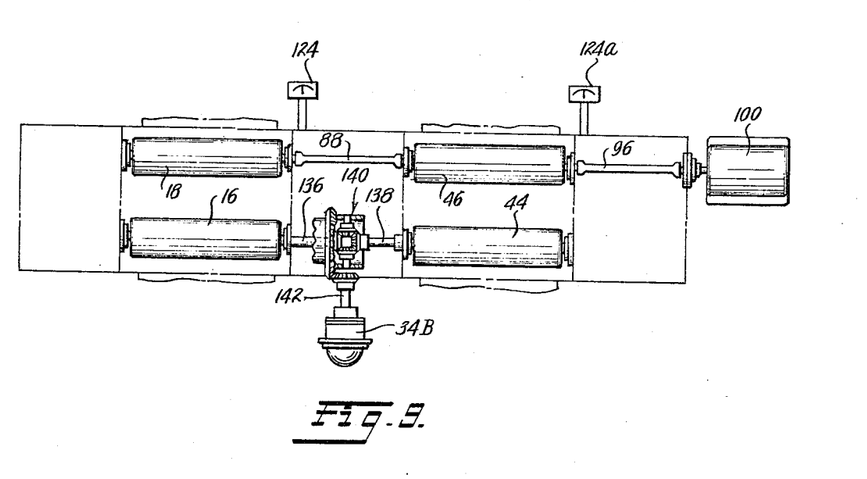
FIG. 9 is a diagrammatic plan view of another embodiment, which is similar to FIG. 8, except that the idle rolls are interconnected by differential gearing having a power absorption unit connected thereto.

FIG. 9 diagrammatically illustrates another embodiment of the invention, which is similar to that shown in FIG. 1, except that the power absorption unit 34, the shaft sections 74 and 76, and the clutch 78 have been omitted; and in lieu thereof, the drive rolls 16 and 44 are interconnected by shaft sections 136 and 138, and a conventional differential gearing assembly 140. A power absorption unit 34B is connected with the output shaft 142 of the differential gear. Here again, the corresponding parts have been identified by the same reference numerals and a description thereof will not be repeated.

The driving of the power absorption unit 34B by the drive rolls 16 and 44, through the differential gearing 140 occurs in a manner that will be obvious. The effectiveness of the brakes on wheels associated with a live axle can also be determined in the manner previously described herein. If the vehicle wheels are on a dead axle, the effectiveness of the brakes thereof can be tested by driving the wheels from the prime mover 100. The procedure for making the brake test is the same as that described in connection with FIG. 8. However, in the structure shown in FIG. 9, the differential gearing will permit the free-phase shift of the sets of rolls 16–18, 44–46 in the event that the brake adjustment on the vehicle wheels is unequal. Any inequality in brake adjustment will be indicated by the meter 124 and 124a, in the manner previously described. Obviously a quill shaft similar to the shaft 88 could be connected between the drive rolls 16 and 44, if desired, in lieu of the differential gearing 140 and power absorption unit 34B.

FIG. 10 diagrammatically illustrates still another embodiment of the invention which is particularly adapted for testing the brakes on vehicle wheels on a live axle. This embodiment includes the four basic rolls consisting of the aligned pair of idle rolls 18 and 46 and the aligned pair of drive rolls 16 and 44. The drive rolls 16 and 44 are interconnected by a quill shaft 88b and indicating system, including a meter 124b, identical to the quill shaft 88 and the meter 124. The drive roll 16 is connected with the power absorption unit 34, as shown. Here again, the vehicle wheels are to be positioned on the rolls 16–18 and 44–46 so that the drive rolls 16 and 44 are closest to the front end of the vehicle undergoing test. The power absorption unit 34 will serve to determine engine performance in the conventional manner of dynamometer testing. In order to test the vehicle brakes, the power absorption unit 34 is unloaded to the point of zero, or minimum power absorption, and the vehicle brakes are applied to absorb the engine horsepower. Should the brakes be unequal in adjustment, one set of rolls engaged by one vehicle wheel will lead, or lag, the other set engaged by the other vehicle wheel within the permitted elastic range of the quill shaft 88b. The force measuring means 124b will indicate the degree of inequality, if any, of the brake adjustments on the two wheels.

Figure 11:
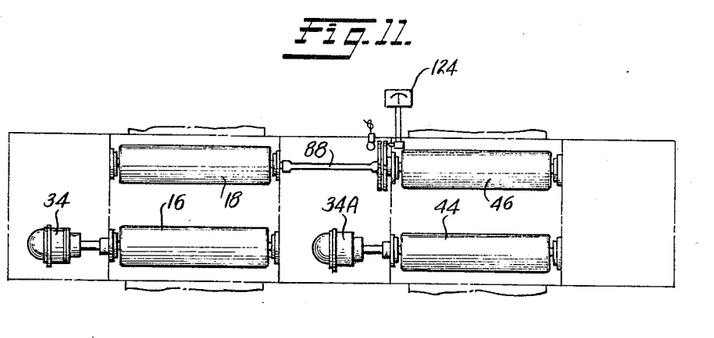
FIG. 11 is a similar view of a combined chassis dynamometer and brake tester, wherein the idle rolls are interconnected by a quill shaft, and wherein each of the drive rolls is connected to a separate power absorption unit.

FIG. 11 diagrammatically illustrates still another embodiment of the invention, which is similar to that shown in FIG. 8, except that the quill shaft 96 and the prime mover 100 have been omitted. Otherwise, corresponding parts have been identified by the same reference numerals. The apparatus shown is particularly adapted for determining engine performance and for also testing the brakes on wheels mounted on a live axle. The dynamometer units 34 and 34A can be used for determining engine performance, after which the units are rendered ineffective and the power being delivered by the engine can be absorbed by the vehicle brakes to determine their effectiveness. Should the brake adjustment on the wheels be unequal, the quill shaft 88 will wind up, as previously described, and the meter means 124 will serve to indicate the amount of wind-up of the quill shaft and the inequality of the adjustment of the wheel brakes.

Figure 12:
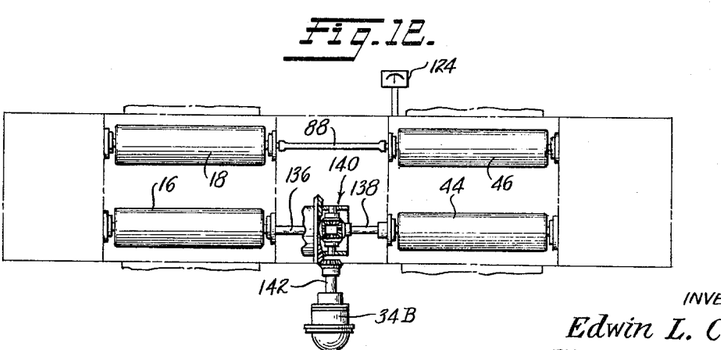
FIG. 12 is a similar view of a combined chassis dynamometer and brake tester, wherein the idle rolls are interconnected by a quill shaft, and the drive rolls are interconnected by a differential gear mechanism having a power absorption unit connected thereto.

FIG. 12 diagrammatically illustrates a still further embodiment of the invention for determining engine performance and testing the brakes on wheels mounted on live axles. This embodiment is identical to that shown in FIG. 9, except that the quill shaft 96 and prime mover 100 have been omitted. The engine power can be determined by the power absorption unit 34B in a conventional dynamometer testing manner. Thereafter, the power absorption unit 34B is unloaded and the brakes are applied to absorb the engine power and to test their effectiveness. Unequal brake adjustment will manifest itself by wind-up of the quill shaft 88, which will be permitted because the differential gearing 140 interconnecting the two drive rolls 16 and 44 will not tend to substantially restrict roll-phase shift. The meter 124 will indicate the inequality of brake adjustment, if any.

It will be understood that various changes may be made in the details of construction and in the arrangement of the parts described hereinbefore, without departing from the principles of the invention or the scope of the annexed claims.

I claim:

1. Apparatus comprising: a pair of rotatably supported, longitudinally aligned rolls engageable by separate, rotatable elements for effecting the rotation of said rolls; means arranged to effect driving of said separate rotatable elements; means including a torsionally elastic member interconnecting said rolls; and means responsive to out-of-phase, rotational displacement of said elastically interconnected rolls for indicating any unequal retardation effect imposed by said separate elements on said interconnected rolls while a braking force is being applied to said separate rotatable elements.

2. Apparatus comprising: two sets of rotatably supported rolls, each adapted to cradle a vehicle wheel therebetween; means including a torsionally elastic member drivingly interconnecting one roll of each of said two sets of rolls; means arranged to drive said one roll of each of said two sets of rolls; and means responsive to out-of-phase rotational displacement of said interconnected rolls permitted by said torsionally elastic member for indicating any unequal braking action being applied to the wheels when engaged with said interconnected rolls.

3. Apparatus comprising: a first rotatable wheel-support member, a second rotatable wheel-support member, and torsionally yieldable means drivingly interconnecting said members; and means responsive to wind up, or torsional twist, of said torsionally yieldable means for indicating the effective torque between said first and said second wheel-support members while a braking force is being applied to wheels engaged with said wheel support members.

4. Apparatus as defined in claim 3, in which the torsionally yieldable means is a shaft, and wherein one end of the shaft is connected with the first wheel-support member through a hub and a coupling is connected with said one end of said shaft and has a splined connection with said hub; and wherein the other end of said shaft is connected with one end of the second wheel-support member by a similar hub and splined coupling.

5. Apparatus as defined in claim 3, including means for limiting the maximum torsional twist that can be imparted to the torsionally yieldable means.

6. Apparatus as defined in claim 5, wherein the means for limiting the angle of twist of the shaft comprises a torque tube fixed at one end to one of said coupling elements and rotatably connected at its other end with the other of said coupling elements, and wherein means permitting limited angular movement connects said other end of said torque tube with the hub associated with said second member.

7. Apparatus as defined in claim 6, in which the means for limiting angular twist of the shaft comprises a disc mounted on said other end of said torque tube, and a disc arranged in confronting relation thereto mounted on the hub connected with said second member; and wherein lost-motion means is provided for establishing a driving connection between said discs upon predetermined relative rotation thereof.

8. Apparatus as defined in claim 7, wherein the lost-motion is provided by a pin carried by one of the discs extending into an elongated slot of predetermined length in the other of said discs.

9. Apparatus as defined in claim 6, in which the means for indicating the torque being transmitted by the shaft comprises: a pair of discs arranged in confronting relation to each other, one of said discs being mounted on the torque tube and the other of said discs being nonrotatably connected with said second member, and wherein both discs have openings therein positioned to overlap more or less depending upon the relative rotary movement of one disc with respect to the other; a light source positioned to one side of said discs to produce a beam that will project across the path of travel of the openings in said discs; a photoconductive cell positioned to the other side of said discs and in the path of said light beam; and meter means actuated by said photoconductive cell for indicating the torque being delivered through said shaft to said second member.

10. A combined chassis dynamometer and brake tester comprising: a pair of rolls; means supporting said rolls in parallel relation to cradle a vehicle wheel therebetween; a power-absorption unit connected with one of said rolls; means for reducing the effectiveness of said power absorption unit to substantially zero; a prime mover connected with the other of said rolls for driving a vehicle wheel cradled therebetween; and means responsive to the torque being transmitted from the prime mover to said other roll, to drive said wheel, for indicating the torque applied to said wheel.

11. A brake tester comprising: two pairs of rolls; means supporting said rolls in end-to-end relation to cradle a pair of vehicle wheels therebetween; first torsionally elastic means interconnecting one roll of each of said pairs of rolls; a prime mover; second torsionally elastic means connecting said prime mover with one of said interconnected rolls for driving a pair of vehicle wheels when engaged therewith; means responsive to wind-up or torsional twist imparted to said second torsionally responsive means by said prime mover to drive said interconnected rolls to indicate the torque being applied by said prime mover; and means responsive to the wind-up or twist imparted to said first torsionally responsive means to indicate any unequal braking force being applied to said wheels while engaged with said pair of rolls.

12. A combined chassis dynamometer and brake tester comprising: two pairs of rolls, means supporting said rolls in and to end relation to cradle a pair of vehicle wheels therebetween; a power-absorption unit connected with one of said pairs of rolls; means for detachably connecting together the aligned rolls of said one pair of rolls; a prime mover connected with the other of said pairs of rolls for driving a pair of vehicle wheels; and means responsive to the torque being transmitted from said prime mover to said other pair of rolls, to drive said wheels, for indicating the torque being applied to the rolls to drive said wheels.

13. A brake tester, comprising: a pair of drive rolls; a pair of idle rolls; means rotatably supporting said drive and idle rolls; a quill shaft drivingly interconnecting said idle rolls; a prime mover; a quill shaft connecting said prime mover with one of said idle rolls, said quill shafts being designed to twist between their ends while transmitting working torque to said idle rolls to drive vehicle wheels when engaged therewith; and means responsive to the degree of twist in the respective quill shafts for indicating the torque being transmitted to the vehicle wheels through the respective quill shafts.

14. Apparatus as defined in claim 13, in which the quill shaft between the prime mover and its associated idle roll is of larger cross sectional area than the quill shaft between said idle rolls.

15. Apparatus as defined in claim 13, including a torque tube nonrotatably connected with one end of each of the quill shafts; a first disc nonrotatably connected with the other end of said torque tube; a second disc adjacent to each of said first discs nonrotatably connected with each of said idle rolls, each of said discs having circumferentially spaced openings formed therein, with at least a portion of the openings in registration when no torque is being transmitted; a light source positioned adjacent to each of said second discs in a position to direct a light beam across the path of travel of the openings in said second discs; a photoconductive cell positioned adjacent each of said first discs in the path of travel of the openings in said first disc and in alignment with said light beam; and a meter connected with each of said photoconductive cells.

16. Apparatus as defined in claim 13, wherein the indicating means associated with each quill shaft is responsive to either clockwise or counterclockwise twist, whereby to indicate any unbalance in the effective braking force applied to the vehicle wheels by the vehicle brakes.

17. A combined chassis dynamometer and brake tester, comprising: an elongated frame; a pair of drive rolls at one side of said frame; means interconnecting said drive rolls for simultaneous rotation, including a clutch for disconnecting said drive rolls at will; a power-absorption unit connected with said drive rolls; a pair of idle rolls at the opposite side of said frame; a quill shaft drivingly interconnecting said idle rolls; a prime mover; a second quill shaft connecting said prime mover with one of said idle rolls, said quill shafts being designed to twist between their ends while transmitting working torque to said idle rolls to drive vehicle wheels when engaged therewith; and means responsive to the degree of twist in the respective quill shafts for indicating the torque being transmitted to the vehicle wheels through the respective quill shafts.

18. A combined chassis dynamometer and brake tester, comprising: frame means; a pair of drive rolls at one side of said frame means; means interconnecting said drive rolls for simultaneous rotation, said means being such as to allow one of said drive rolls to rotate relative to the other; a power-absorption unit operatively connected with said drive rolls; a pair of idle rolls at the opposite side of said frame means; and a quill shaft drivingly interconnecting said idle rolls, said quill shaft being designed to twist between its ends, if necessary, while the vehicle wheels are engaged therewith.

19. Apparatus as defined in claim 18, wherein the means interconnecting the drive rolls includes differential gearing.

20. A combined chassis dynamometer and brake tester, comprising: elongated frame means, a pair of drive rolls at one side of said frame means; power absorption means connected to be driven by at least one of said drive rolls; a pair of idle rolls at the opposite side of said frame means; a prime mover ararnged to drive each of said idle rolls; a quill shaft connecting each prime mover with one of said idle rolls, said quill shafts being designed to twist between their ends in delivering working torque from the prime movers to the idle rolls connected therewith to drive a vehicle wheel when engaged with said idle rolls; and means responsive to the angular twist of said quill shafts for indicating the torque being delivered by each prime mover to its associated idle roll.

21. A combined chassis dynamometer and brake tester, comprising: a pair of aligned frames, each carrying a pair of rolls arranged with the rolls in end-to-end relationship to provide an aligned pair of drive rolls and an aligned pair of idle rolls; a shaft interconnecting the pair of drive rolls; a clutch interposed in said shaft for disconnecting said drive rolls at will; power absorption means connected with said pair of drive rolls; a separate prime mover arranged to drive each of said idle rolls; means connecting each of said prime movers with one of said idle rolls including a quill shaft designed so that it will twist between its ends while transmitting working torque to the idle roll connected therewith to drive a vehicle wheel; and means responsive to the angle of twist of each of said quill shafts for indicating the torque being delivered to the respective roll.

22. A combined chassis dynamometer and brake tester comprising: elongated frame means, a pair of drive rolls at one side of said frame means; means interconnecting said drive rolls for simultaneous rotation, including a clutch disengageable at will; a power absorption unit connected with one of said drive rolls; a pair of idle rolls at the opposite side of said frame means; a separate prime mover for driving each of said idle rolls; a quill shaft connecting each of said prime movers with one of said idle rolls, said quill shafts being designed to twist between their ends in delivering working torque from their respective prime movers to the idle rolls connected therewith to drive a vehicle wheel when engaged with said idle rolls; and means responsive to the angular twist of said quill shafts for indicating the torque being delivered by each prime mover to its associated idle roll.

23. A combined chassis dynamometer and brake tester, comprising: two pairs of longitudinally aligned parallel rolls engageable by a pair of vehicle wheels; power absorption means connected to be driven by the two rolls closest to the front of a vehicle under test for the purpose of absorbing engine power from the vehicle wheels; and prime mover means connected to drive the remaining two rolls for the purpose of applying power to the vehicle wheels to test the brakes on said vehicle wheels.

24. Apparatus as defined in claim 23, wherein indicating means is provided for measuring the power delivered by the prime mover means to the vehicle wheels.

25. A combined chassis dynamometer and brake tester, comprising: two sets of longitudinally aligned roll means engageable by a pair of vehicle wheels; power absorption means arranged to be driven by the set of longitudinally aligned roll means closest to the pair of front wheels of a vehicle under test; and torsionally elastic means interconnecting the longitudinally aligned roll means of at least one of said sets of aligned roll means, whereby to permit a rotational phase shift of one of the roll means engaged by one vehicle wheel of said pair of wheels relative to the roll means engaged by the other vehicle wheel of said pair, without change in roll speed when the force derived from said one vehicle wheel is different from that derived from said other vehicle wheel.

26. Apparatus as defined in claim 25, wherein indicating means is provided for measuring the force difference, if any, applied to the respective roll means by the pair of vehicle wheels engaged therewith.

27. The method of testing the brakes of a vehicle on a combined chassis dynamometer and brake tester having pairs of longitudinally aligned parallel rolls, each pair being engageable by one of a pair of vehicle wheels, power absorption means connected to be driven by the pair of rolls closest to the front end of a vehicle under test for the purpose of absorbing power from the vehicle wheels, comprising: positioning a vehicle on the rolls so that the idle rolls are disposed farthest from the front end of the vehicle; operating the vehicle engine to drive the wheels engaged with the rolls and absorbing said power by the power absorption means; measuring the power being delivered by the vehicle wheels to said rolls to determine the capacity of the wheel brakes; unloading the power absorption means; applying the vehicle brakes to absorb the power being delivered by said wheels to said rolls; and measuring the difference, if any, in the force applied to the pair of rolls farthest from the front end of said vehicle by the respective vehicle wheels at the same wheel speed to determine whether the brakes on said pair of wheels are equally adjusted.

References Cited by the Examiner

UNITED STATES PATENTS

| | | | |
|---|---|---|---|
| 1,685,297 | 9/1928 | Shone | 73—126 |
| 1,755,287 | 4/1930 | Donavan | 73—126 |
| 1,884,261 | 10/1932 | Rossetter | 73—126 |
| 1,946,100 | 2/1934 | Norton | 73—136 |
| 2,394,022 | 2/1946 | Storrie | 73—139 |
| 2,640,352 | 6/1953 | Ellison et al. | 73—136 |
| 2,756,622 | 7/1956 | La Belle | 73—139 X |
| 2,766,617 | 10/1956 | Tyler et al. | 73—136 |
| 3,111,028 | 11/1963 | Lebow | 73—136 |

FOREIGN PATENTS 576,988   6/1959   Canada.

RICHARD C. QUEISSER, *Primary Examiner.*

CHARLES A. RUEHL, *Assistant Examiner.*